(12) United States Patent
Even

(10) Patent No.: US 7,093,388 B1
(45) Date of Patent: Aug. 22, 2006

(54) STORAGE DEVICE FOR SINKER BALLS USED IN SPORTFISHING

(76) Inventor: Randy P. Even, 4226 S. 13th St., Sheboygan, WI (US) 53081

( * ) Notice: Subject to any disclaimer, the term of this patent is extended or adjusted under 35 U.S.C. 154(b) by 0 days.

(21) Appl. No.: 10/922,042

(22) Filed: Aug. 19, 2004

(51) Int. Cl.
*A01K 97/00* (2006.01)

(52) U.S. Cl. ....................................... 43/54.1

(58) Field of Classification Search ................ 43/54.1, 43/21.2; 206/315.11; 248/292.12, 311.2; 224/926; 114/255
See application file for complete search history.

(56) References Cited

U.S. PATENT DOCUMENTS

| | | | | |
|---|---|---|---|---|
| 1,022,791 A | * | 4/1912 | Laird | 224/249 |
| 1,109,161 A | * | 9/1914 | Chindgren | 224/148.4 |
| 2,548,080 A | * | 4/1951 | Thorn | 224/663 |
| 3,006,588 A | * | 10/1961 | Lemi | 248/512 |
| 5,507,113 A | * | 4/1996 | Keller | 43/55 |
| 5,519,959 A | * | 5/1996 | Cross | 43/21.2 |
| 5,669,536 A | * | 9/1997 | Wang | 224/443 |
| 5,930,888 A | | 8/1999 | Ball et al. | |
| 5,964,443 A | * | 10/1999 | Leveille | 248/478 |
| 6,010,045 A | * | 1/2000 | Rogers et al. | 224/198 |
| 6,079,682 A | * | 6/2000 | Olkkola | 248/278.1 |
| 6,269,990 B1 | * | 8/2001 | Gray | 224/200 |
| 6,663,068 B1 | * | 12/2003 | Huang | 248/311.2 |
| 6,668,745 B1 | * | 12/2003 | Slatter | 114/255 |
| 2005/0039377 A1 | * | 2/2005 | Clary | 43/54.1 |

* cited by examiner

*Primary Examiner*—Kurt Rowan
(74) *Attorney, Agent, or Firm*—Andrus, Sceales, Starke & Sawall, LLP

(57) ABSTRACT

A storage device is provided for separately holding non-split sinkers having eyelets at top ends thereof relative to a support surface. At least one retainer is provided for individually holding a single non-split sinker fixed relative thereto. The retainer has a sidewall structure forming an internal pocket for retaining the non-split sinker, and a vertical support wall joined to the retainer sidewall. A pair of cooperable mating devices is engaged with the support surface. One of the hubs is attached to the vertical support wall and both of the hubs are clamped together on the support surface.

37 Claims, 3 Drawing Sheets

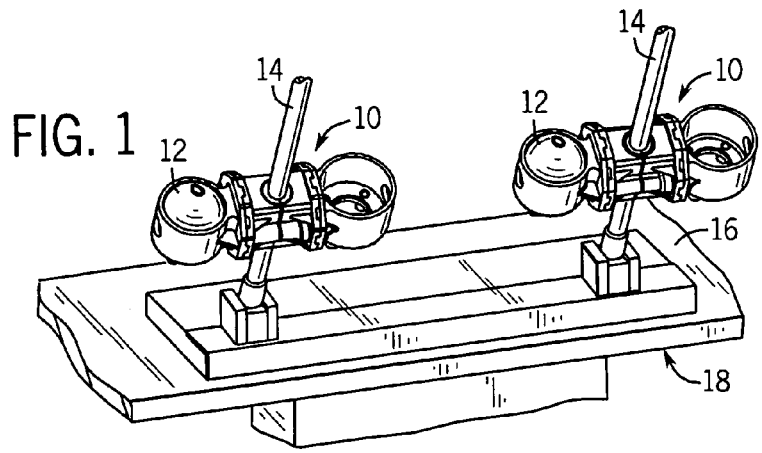
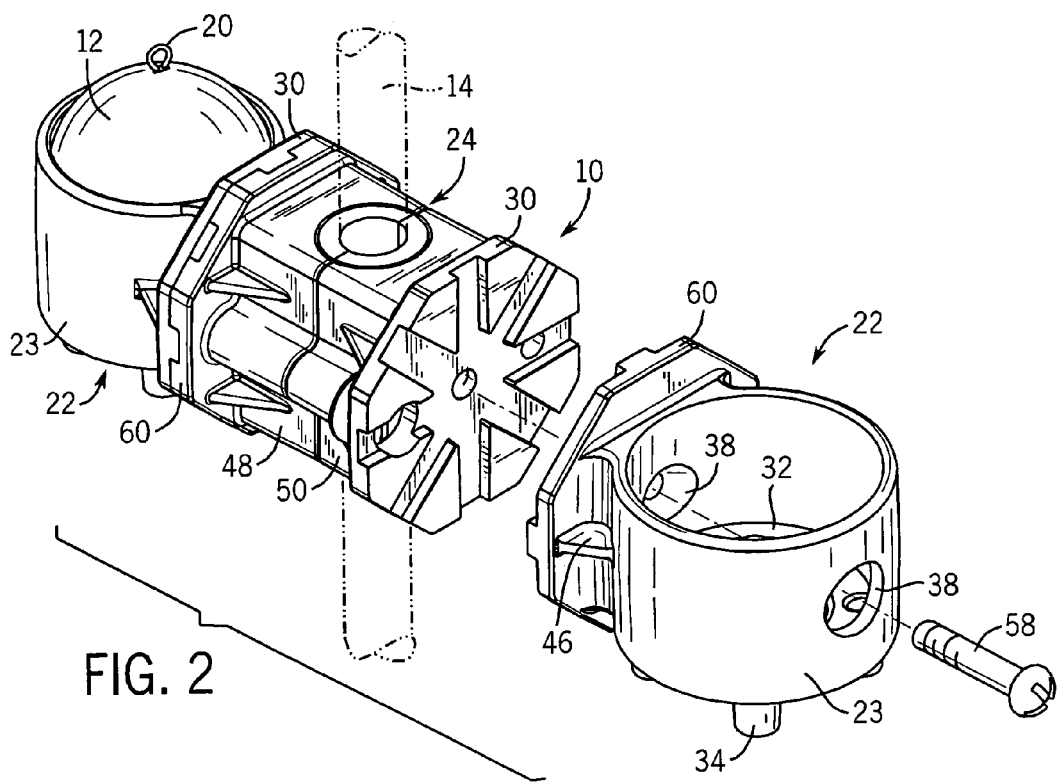
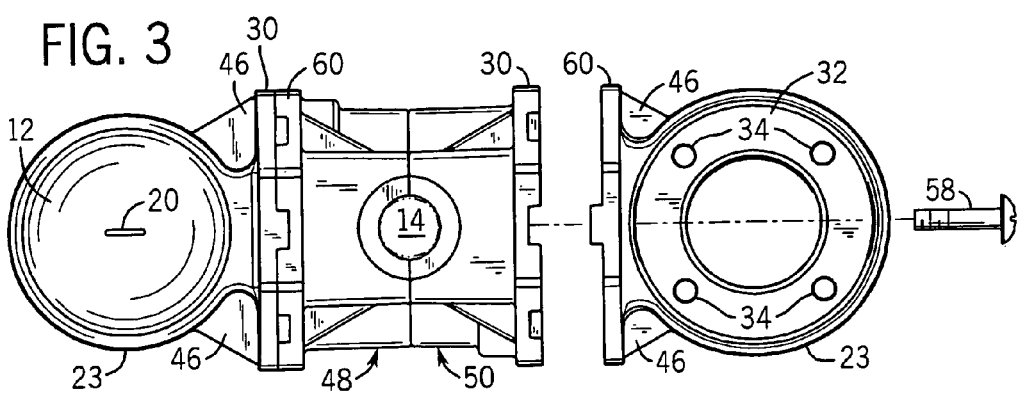

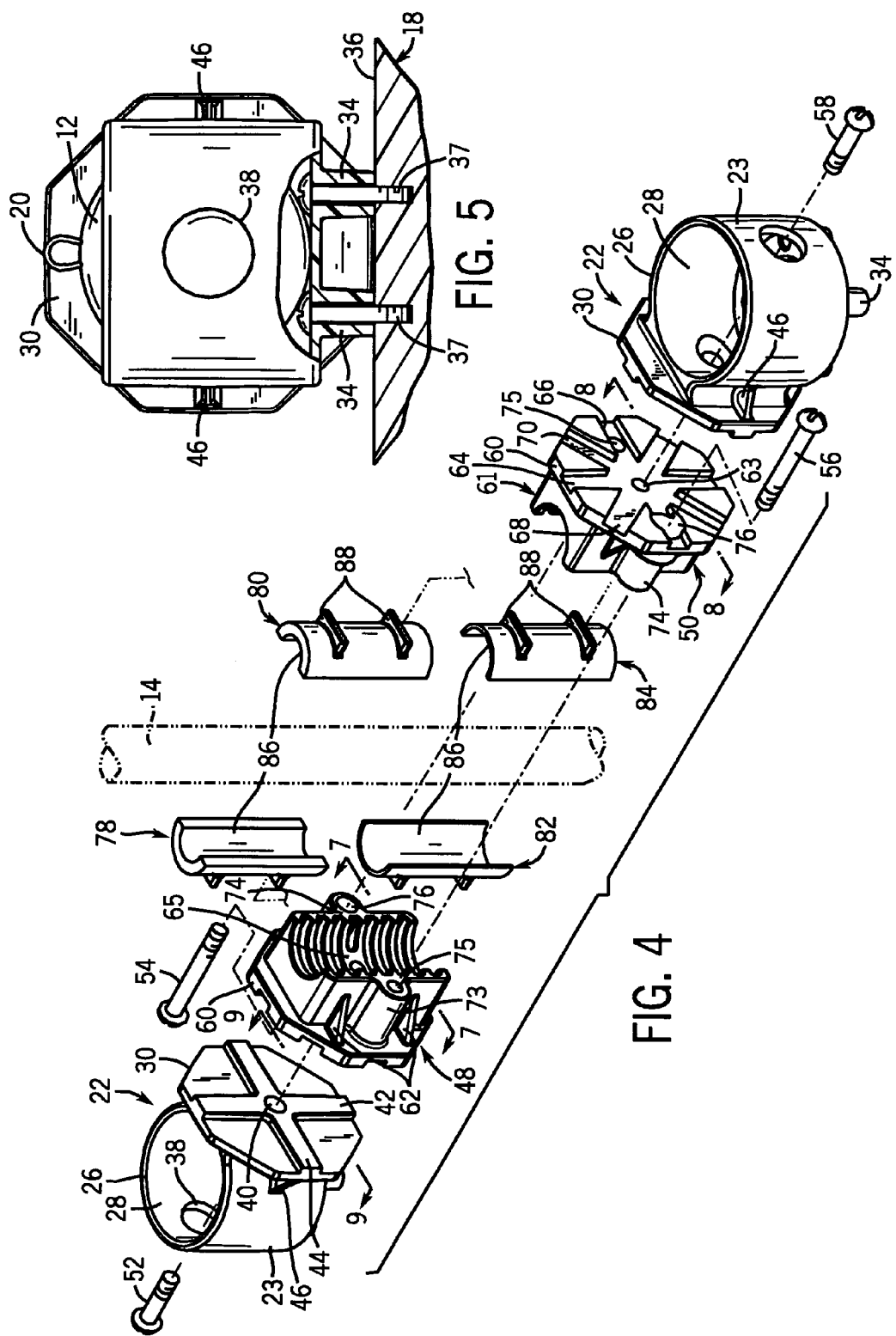

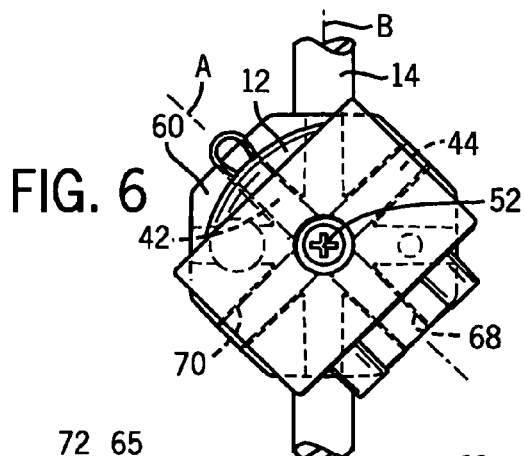
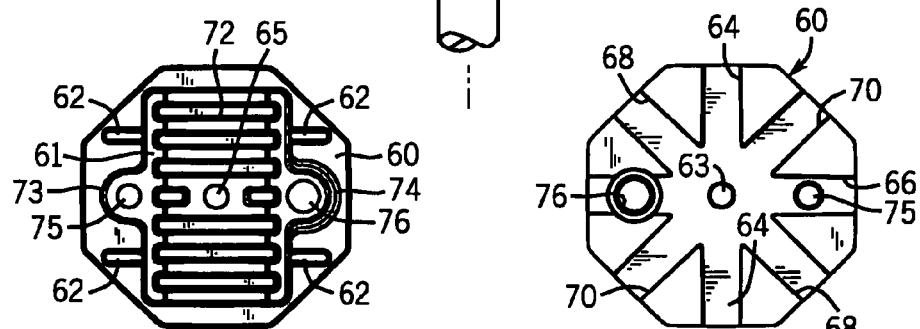
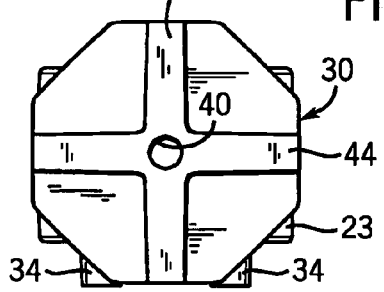
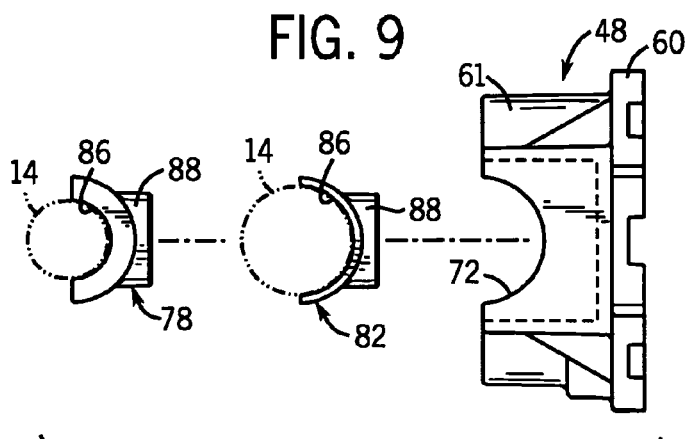

STORAGE DEVICE FOR SINKER BALLS USED IN SPORTFISHING

FIELD OF THE INVENTION

The present invention generally relates to fishing equipment and, more particularly, pertains to a storage device for managing and retaining one or more sinker balls aboard a fishing vessel.

BACKGROUND OF THE INVENTION

In sportfishing, trolling is a technique which is used extensively to fish at the surface of the water and also to fish much deeper for species of fish which normally forage at greater depths in salt and fresh water bodies of water. Lake trout are an example of a fresh water species which feed at depths which can range to 60 feet or more from the surface. To this end, it is conventional for a fisherman to secure a relatively large weight or sinker to the end of a fishing line and then attach an artificial or natural bait which will be maintained substantially at a predetermined depth. Sinkers used in Great Lakes fishing are typically spherical, non-split anchors generally weighing 24 or 32 ounces and having retainers or eyelets at their top ends for engaging the fishing line.

Because of their inherent size and shape, fishermen have encountered some drawbacks in the handling of such sinker balls. For example, in preparing for a fishing outing, setting up of fishing equipment involves juggling a rod, line and bait while accessing sinker balls from a box or the like which might not be ideally located relative to the set up location. Also, in reeling in a fish that has been caught, the fishing line is raised causing the sinker ball to swing precariously back and forth. From a safety standpoint, it is important to control the sinker ball so that it does not injure the head or body of someone on the boat, and is not tripped upon if it is deposited on the deck and rolls thereon.

Accordingly, it is desirable to provide a storage device which is normally conveniently mounted on different portions of a fishing boat to enable convenient and reliable storage and retrieval of sinker balls in a manner which overcomes the drawbacks set forth above.

SUMMARY OF THE INVENTION

It is a general object of the present invention to provide a practical solution for the safe and efficient storage of relatively large, non-split sinker balls used in sportfishing.

It is one object of the present invention to provide a sinker storage device which will permit the retention of one or more sinkers at various preferred locations on a fishing boat.

It is also an object of the present invention to provide a sinker storage device having a versatile mounting arrangement which will enable sinkers to be conveniently held in pockets on variously sized vertical and horizontal railings, downrigger or booms, and other boat-mounted surfaces.

It is another object of the present invention to provide a sinker storage device which is capable of holding different sizes and combinations of sinkers at various angles relative to a mounting surface.

It is a further object of the present invention to provide a sinker storage device which is easily assembled and converted into a different formation.

It is an additional object of the present invention to provide a sinker storage device which will withstand weather and harmful UV rays.

In one aspect of the invention, a boat-mounted storage device is provided for separately holding non-split sinkers having eyelets at their top ends. The storage device includes a retainer structure for individually holding the non-split sinkers fixed relative thereto, and a mounting arrangement fastening the retainer structure to a preferred surface of a fishing boat. The retainer structure includes at least one cup having a cylindrical sidewall forming an internal pocket retaining only one of the non-split sinkers therein, and a vertical support wall joined to the cup sidewall. The cup has an open top, an open bottom wall and the cylindrical sidewall is formed with a pair of aligned openings on opposite sides of the sidewall in register with a central hole provided in the vertical support wall. The open bottom wall is formed with a plurality of downwardly depending bosses for facilitating attachment of the retaining structure to the fishing boat. The mounting arrangement includes a pair of cooperable, mating hubs joined to each other, the vertical wall and the preferred surface of the fishing boat. Each of the hubs is formed with a cradle portion having a semi-cylindrical surface constructed and arranged so that each surface will mate in surrounding relationship upon a corresponding portion of a round support surface on the fishing boat. The round support surface is preferably a railing or downrigger boom. Each of the hubs is also formed with a base provided with a slot formation and a central aperture. The mounting arrangement includes multiple fasteners for joining the retainer structure to the fishing boat. The central aperture in one hub is aligned with the central hole in the vertical support wall of the at least one cup, and a first fastener is passed through the central hole and the central aperture to hold the one hub to the at least one cup. The vertical support wall on the at least one cup is formed with spline structure matingly engageable with the slot formation on the base of one of the hubs to enable changing of an angular position of the at least one cup relative to the one hub. Each hub is formed with a pair of parallel throughbores so that placing the respective cradle portions of the hubs together will align the pair of parallel throughbores on one hub with the pair of parallel throughbores on the other hub. The second and third fasteners are passed through the aligned throughbores to secure the pair of hubs and the at least one cup to the round support surface of the fishing boat. Each semi-cylindrical surface on each hub is provided with a shim for accommodating different sizes of the round support surface on the fishing boat.

In another embodiment, the retainer structure includes a second cup having a cylindrical sidewall forming an internal pocket for holding only one of the non-split sinkers therein, and a vertical support wall joined to the second cup sidewall. The second cup has an open top, an open bottom wall and the cylindrical sidewall is formed with a pair of aligned openings on opposite sides of the sidewall in register with a central hole provided in the vertical support wall. The vertical support wall on the second cup is formed with spline structure matingly engageable with the slot formation on the base of the other hub to enable changing angular position of the second cup relative to the other hub. The central aperture on the other hub is aligned with the central hole in the vertical support wall of the second cup. A fourth fastener is passed through the central aperture on the other hub and the central hole in the vertical support wall of the second cup to attach both cups and both hubs to the round support surface of the fishing boat. The spline structure on the one cup and the second cup includes a vertical spline intersecting a horizontal spline at substantially a 90 degree angle. The slot formation on the bases of both hubs includes a vertical slot and a pair of criss crossing or diagonally extending slots intersecting the vertical slot enabling the respective cups to be positioned at incremental 45 degree positions relative to their respective hubs.

In another aspect of the invention, a storage device is provided for separately holding non-split sinkers having eyelets at top ends thereof relative to a support surface. The storage device includes at least one retainer for individually holding a single non-split sinker fixed relative thereto. The retainer has a sidewall forming an internal pocket for retaining the non-split sinker, and a vertical support wall joined to the retainer sidewall. A pair of cooperable mating hubs is engageable with the support surface. One of the hubs is attached to the vertical support wall and both of the hubs are clamped together on the support surface. The storage device also includes a second retainer for individually holding a single non-split sinker fixed relative thereto. The second retainer has a sidewall forming an internal pocket for retaining the non-split sinker, and a vertical support wall joined to the second retainer sidewall. The second retainer vertical support wall is attached to the other of the hubs. Both retainers are angularly adjustable relative to their respective hubs. The internal pockets of both retainers are constructed and arranged to hold differently sized non-split sinkers.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a partial perspective view of multiple sinker ball storage devices embodying the present invention as mounted on downrigger booms of a sportfishing boat;

FIG. 2 is an enlarged, perspective, exploded view of a pair of sinker ball storage devices coupled to a vertical railing;

FIG. 3 is a plan view of FIG. 2;

FIG. 4 is an exploded, perspective view of FIG. 2 with the sinker ball removed;

FIG. 5 is an end view of a single sinker ball retainer structure attached to a surface of the boat;

FIG. 6 is a view taken from the left side of FIG. 2 showing a sinker ball retainer structure angled 45 degrees relative to its mounting hub;

FIG. 7 is a view taken on line 7—7 of FIG. 4;

FIG. 8 is a view taken on line 8—8 of FIG. 4;

FIG. 9 is a view taken on line 9—9 of FIG. 4; and

FIG. 10 is a top view of the hub of FIG. 9 showing two different shims capable of being used therein.

DETAILED DESCRIPTION OF THE INVENTION

Referring now the drawings, FIG. 1 illustrates multiple sinker ball storage devices 10 for separately holding sinker balls 12 relative to a support surface 14, or in this case, cylindrical downrigger booms pivotally mounted on a stem 16 of a boat 18. The sinker balls 12 individually retained and managed in the storage devices 10 are typically non-split, reusable spherical anchors weighing approximately 24 or 32 ounces and carrying retainers or eyelets 20 at top ends thereof for engagement with fishing lines. As will be understood hereafter, the support surfaces 14 may include cylindrical vertical, horizontal or angled railings as well as planar surfaces such as boat decks.

In its broadest form, each storage device 10 is comprised of a retainer structure 22 for holding at least one non-split sinker 12 fixed therein, and a mounting arrangement 24 fastening the retainer structure 22 to a preferred surface 14 of the boat 18. Referring now to FIGS. 2–5, the retainer structure 22 includes a pair of cups 23, each having a cylindrical sidewall 26 forming an internal pocket 28 for maintaining only one non-split sinker ball 12 fixed therein. The cups 23 are basically identical except that each is preferably formed with a different inner diameter which will accommodate at least one size of sinker ball 12. Each cup 23 further includes a vertical support wall 30 which is integrally joined to the cylindrical sidewall 26, and provides for selectively changing the angular position of and connecting the retainer structure 22 relative to its mounting arrangement 24 and its support surface 14.

Each cup 23 has an open top, and an open bottom wall 32 constructed with a plurality of downwardly depending bosses 34 having apertures provided therein for facilitating a fixed, non-adjustable attachment of a singular retainer structure 22 to a planar surface 36 (FIG. 5) of the boat 18 as will be described hereafter. The cylindrical sidewall 26 of each cup 23 is formed with a pair of aligned openings 38 on opposite sides thereof in register with a central hole 40 provided in the integral vertical support wall 30. As seen best in FIGS. 4 and 9, the vertical support wall 30 carries a projecting spline structure including a vertical spline 42 and a horizontal spline 44 intersecting the vertical spline 42 at a substantially 90 degree angle. The central hole 40 passes through the intersection of the vertical and horizontal splines 42, 44. The joinder of the vertical support wall 30 to the cup 23 is reinforced by webs 46 extending therebetween.

The mounting arrangement 24 includes a pair of cooperable mating retainer clamps or hubs 48, 50 which are joined to each other, the vertical support walls 30 on cups 23 and the support surface 14 by multiple threaded fasteners 52, 54, 56, 58. Each hub 48, 50 is identical and includes a base 60, a cradle portion 61 and webs 62 extending between the base 60 and the cradle portion 61. As shown in FIGS. 4 and 8, each base 60 is formed with a central aperture 63 and a slot formation defined by a vertical slot 64, a horizontal slot 66 and a pair of criss crossing or diagonally extending slots 68, 70. All the slots 64, 66, 68, 70 intersect together at central aperture 63 which is aligned with central hole 40 in vertical support wall 30. The central aperture 63 extends through a central bore 65 in the cradle portion 61 and exits from a grooved, semi-cylindrical surface 72. The hubs 48, 50 are designed so that each surface 72 mates in surrounding relationship upon a corresponding portion of a cylindrical support surface 14 such as a railing or downrigger boom as shown in FIGS. 2 and 3. Each cradle portion 61 has a pair of oppositely disposed barrels 73, 74 defining parallel throughbores 75, 76 which extend through the cradle portion 61 and the base 60. When hubs 48, 50 are mated together around support surface 14, throughbores 75 and 76 are aligned with each other.

In use, at least one retainer structure 22 is attached to one hub 48 by passing fastener 52 through aligned openings 38 on cup 23, central hole 40 on vertical support wall 30, and central aperture 63 on hub base 60, and then threading fastener 52 in the central bore 65 on hub 48. Once the one cup 23 is secured to one hub 48, the semi-cylindrical surfaces 72 of both hubs 48, 50 are manually placed around support surface 14 while fastener 54 is passed through throughbore 76 on hub 48 and threaded into throughbore 75 on mating hub 50. Fastener 56 is passed through throughbore 76 on hub 50 and threaded into throughbore 75 on hub 48. The retainer structure 22 is then tightly clamped on support surface 14 at the location desired by the fisherman, and a sinker ball 12 can be retained in the cup 23. In the event a second retainer structure 22 is desired to hold another sinker ball 12, fastener 58 is passed through aligned openings 38 on the second cup 23, central hole 40 and vertical support wall 30 of the second cup 23, and central aperture 63 of hub 50, and then threaded into a corresponding central bore 65 on hub 50. A fisherman can access either sinker ball 12 either by using the eyelet 20, or by elevating the sinker ball 12 by using his/her fingers through the open bottom wall 32.

The storage device 30 is normally designed to be clamped to a cylindrical support surface 14 having a predetermined diameter, typically one inch. However, in order to accommodate support surfaces 14 and different diameters, the storage device 10 includes two pairs of mating shims. As seen in FIG. 4, a first pair of shims 78, 80 is used to fit a rail ⅝ inches in diameter while a second pair of shims 82, 84 is employed with rail diameters of ⅞ inches. Each shim 78, 80, 82, 84 has a semi-cylindrical cradle portion 86 which conforms to a portion of support surface 14, and a pair of spaced apart tabs 88. The tabs 88 extend outwardly from an underside of the cradle portion 86 and are frictionally received within the grooved semi-cylindrical surfaces 72 of the hubs 48, 50 as best shown in FIG. 10 before being applied to the particular support surface 14.

In the foregoing description, each of the retainer structures 22 are oriented in an upright direction so that the longitudinal axis of the cups 23 is substantially parallel to a longitudinal axis of the support surface 14. However, it is a feature of the invention that such retainer structure 22 may be mounted at various angular positions relative to its respective hub 48 or 50. This is accomplished by engaging the spline structure on the cup vertical support wall 30 in different orientations with the slot formation on the hub base 60. One example of this feature is represented in FIG. 6 wherein the cup 23 is angularly mounted on the hub 48 so that the longitudinal axis A of the cup 23 is oriented at 45 degrees relative to the longitudinal axis B of the support surface 14. To obtain this configuration, one simply engages the vertical spline 42 and the horizontal spline 44 on vertical support wall 30 with the diagonal slots 68 and 70, respectively, on the hub base 60 before joining the retainer structure 22 to its respective hub 48 or 50 using fasteners 52 or 58. It is noted that the spline structure and slot formation will allow for different positions at certain 45 degree increments. With this construction, the sinker balls 12 can be positioned at different angles desired by the fisherman. Although not shown, this feature allows the retainer structures 22 to be mounted to a round horizontal support surface, as well as the round vertical support surface 14 shown in the drawings.

Should it be desired to mount a single retainer structure 22 on the planar surface 36 of the boat 18 as shown in FIG. 5, one drills holes in the planar surface 36 which are aligned with the apertures in the bosses 34. Then, a series of fasteners 37 can be passed through the boss apertures and threaded into planar boat surface 36.

When setting up fishing lines, the fisherman can strategically place the sinker ball storage device 10 wherever desired so that the device will function as a "third hand". Also, in the retrieval of fish, a swinging sinker ball 12 on the end of a raised fishing line may be safely and conveniently deposited in the storage device 10 as mounted in FIG. 1 so as to ensure the safety of those aboard the fishing boat.

It should now be appreciated that the present invention provides a versatile storage device for fixedly holding and managing sinker balls in a manner which will improve the efficiency and safety of the fisherman particularly on a charter boat with multiple fishing lines and fishermen. The storage device enables a customized sinker ball storage by allowing a fisherman to select the desired location and angular orientation of the retainer structure relative to the physical construction or layout of the particular boat employed. The components of the storage device are generally formed from ABS plastic which will withstand various weather conditions and harmful UV rays of the sun.

While the present invention has been set forth for preferred use on a boat, it should be understood that a fisherman may also utilize the storage device on a set-up site at a pier, dock or other support surface adjacent the fishing boat.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

I claim:

1. A sinker storage device mounted to an upper deck of and entirely inside a boat for separately holding non-split sinkers having eyelets at top ends thereof, the device comprising:
   a tubular sinker retainer structure having a substantially closed sidewall for individually holding the non-split sinkers fixed relative thereto such that the top end of the sinker always protrudes from the sinker retainer structure; and
   a mounting arrangement fastening the sinker retainer structure to topside support surface within a fishing boat,
   wherein the sinker retainer structure and the mounting arrangement are coupled together by a spline and slot arrangement,
   wherein the sinker retainer structure includes at least one cup having a cylindrical sidewall forming an internal pocket retaining only one of the non-split sinkers therein, and a vertical support wall joined to the cup sidewall,
   wherein the cup has an open top, an open bottom wall and the cylindrical sidewall is formed with a pair of aligned openings on opposite sides of the sidewall in register with a central hole provided in the vertical support wall, and
   wherein the open bottom wall is formed with a plurality of downwardly depending bosses for facilitating attachment of the sinker retainer structure to the fishing boat.

2. The sinker storage device of claim 1, wherein the mounting arrangement includes a pair of cooperable mating hubs joined to each other, the vertical support wall and the topside support surface of the fishing boat.

3. The sinker storage device of claim 2, wherein each of the hubs is formed with a cradle portion having a semi-cylindrical surface constructed and arranged so that each surface will mate in surrounding relationship upon a corresponding portion of a round support surface on the fishing boat.

4. The sinker storage device of claim 3, wherein the round support surface is a railing or downrigger boom.

5. The sinker storage device of claim 3, wherein each of the hubs is also formed with a base provided with a slot formation and a central aperture.

6. The sinker storage device of claim 5, wherein the mounting arrangement includes multiple fasteners for joining the sinker retainer structure to the fishing boat.

7. The sinker storage device of claim 6, wherein the central aperture in one hub is aligned with the central hole in the vertical support wall of the at least one cup, and a first fastener is passed through the central hole and the central aperture to hold the one hub to the at least one cup.

8. The sinker storage device of claim 5, wherein the vertical support wall on the at least one cup is formed with spline structure matingly engageable with the slot formation on the base of one of the hubs to enable changing of an angular position of the at least one cup relative to the one hub.

9. The sinker storage device of claim 8, wherein each hub is formed with a pair of parallel throughbores so that placing respective cradle portions of the hubs together will align the pair of parallel throughbores on one hub with the pair of parallel throughbores on the other hub.

10. The sinker storage device of claim 9, wherein second and third fasteners are passed through the aligned throughbores to secure the pair of hubs and the at least one cup to the round support surface of the fishing boat.

11. The sinker storage device of claim 8, wherein each semi-cylindrical surface on each hub is provided with a shim for accommodating different sizes of the round support surface on the fishing boat.

12. The sinker storage device of claim 11, wherein the sinker retainer structure includes a second cup having a cylindrical sidewall forming an internal pocket for holding only one of the non-split sinkers therein, and a vertical support wall joined to the second cup sidewall.

13. The sinker storage device of claim 12, wherein the second cup has an open top, an open bottom wall and the cylindrical sidewall is formed with a pair of aligned openings on opposite sides of the sidewall in register with a central hole provided in the vertical support wall.

14. The sinker storage device of claim 13, wherein the vertical support wall on the second cup is formed with spline structure matingly engageable with the slot formation on the base of the other hub to enable changing angular position of the second cup relative to the other hub.

15. The sinker storage device of claim 14, wherein the central aperture on the other hub is aligned with the central hole on the vertical support wall of the second cup.

16. The sinker storage device of claim 15, wherein a fourth fastener is passed through the central aperture on the other hub and the central hole in the vertical support wall of the second cup to attach both cups and both hubs to the round support surface of the fishing boat.

17. The sinker storage device of claim 14, wherein the spline structure on the one cup and the second cup includes a vertical spline intersecting a horizontal spline at substantially a 90 degree angle.

18. The sinker storage device of claim 17, wherein the slot formations on the bases of both hubs include a vertical slot and a pair of diagonally extending slots intersecting the vertical slot enabling respective cups to be positioned at incremental 45 degree positions relative to their respective hubs.

19. A sinker storage device of for separately holding non-split sinkers having eyelets at top ends thereof relative to a support surface, the device comprising:

a first tubular sinker retainer for individually holding a single non-split sinker fixed relative thereto, the first sinker retainer having a substantially closed sidewall forming an internal pocket for retaining the non-split sinker, and a splined vertical support wall joined to the sinker retainer sidewall; and a pair of cooperable mating hubs engageable with the support surface, one of the hubs being matingly attached to the splined vertical support wall to enable changing an angular position of the first sinker retainer, relative to the one hub about an axis perpendicular to the vertical support wall and both of the hubs being clamped together on the support surface, and a second tubular sinker retainer for individually holding a single non-split sinker fixed relative thereto, the second sinker retainer having a sidewall forming an internal pocket for retaining the non-split sinker, and a splined vertical support wall joined to the second sinker retainer sidewall.

20. The sinker storage device of claim 19, wherein the second sinker retainer vertical support wall is attached to the other of the hubs.

21. The sinker storage device of claim 20, wherein both sinker retainers are angularly adjustable relative to their respective hubs.

22. The sinker storage device of claim 21, wherein the internal pockets of both sinker retainers are constructed and arranged to hold differently sized non-split sinkers.

23. A boat-mounted storage device for separately holding non-split sinkers having eyelets at top ends thereof, the device comprising:

a retainer structure for individually holding the non-split sinkers fixed relative thereto; and a mounting arrangement fastening the retainer structure to a support surface of a fishing boat, wherein the retainer structure includes at least one cup having a cylindrical sidewall forming an internal pocket retaining only one of the non-split sinkers therein, and a vertical support wall joined to the cup sidewall, wherein the cup has an open top, an open bottom wall and the cylindrical sidewall is formed with a pair of aligned openings on opposite sides of the sidewall n register with a central hole provided in the vertical support wall, wherein the mounting arrangement includes a pair of cooperable mating hubs joined to each other, the vertical support wall and the support surface of the fishing boat, wherein each of the hubs is formed with a cradle portion having a semi-cylindrical surface constructed and arranged so that each surface will mate in surrounding relationship upon a corresponding portion of a round support surface on the fishing boat, wherein each of the hubs is also formed with a base provided with a slot formation and a central aperture, and wherein the vertical support wall on the at least one cup is formed with spline structure matingly engageable with the slot formation on the base of one of the hubs to enable changing of an angular position of the at least one cup relative to the one hub.

24. The sinker storage device of claim 23, wherein the open bottom wall is formed with a plurality of downwardly depending bosses for facilitating attachment of the retainer structure to the fishing boat.

25. The sinker storage device of claim 23, wherein the round support surface is a railing or downrigger boom.

26. The sinker storage device of claim 23, wherein the mounting arrangement includes multiple fasteners for joining the retainer structure to the fishing boat.

27. The sinker storage device of claim 23, wherein the central aperture in one hub is aligned with the central hole in the vertical support wall of the at least one cup, and a first fastener is passed through the central hole and the central aperture to hold the one hub to the at least one cup.

28. The sinker storage device of claim 23, wherein each hub is formed with a pair of parallel throughbores so that placing respective cradle portions of the hubs together will align the pair of parallel throughbores on one hub with the pair of parallel throughbores on the other hub.

29. The sinker storage device of claim 28, wherein second and third fasteners are passed through the aligned throughbores to secure the pair of hubs and the at least one cup to the round support surface of the fishing boat.

30. The sinker storage device of claim 23, wherein each semi-cylindrical surface on each hub is provided with a shim for accommodating different sizes of the round support surface on the fishing boat.

31. The sinker storage device of claim 30, wherein the retainer structure includes a second cup having a cylindrical sidewall forming an internal pocket for holding only one of the non-split sinkers therein, and a vertical support wall joined to the second cup sidewall.

32. The sinker storage device of claim 31, wherein the second cup has an open top, an open bottom wall and the cylindrical sidewall is formed with a pair of aligned openings on opposite sides of the sidewall in register with a central hole provided in the vertical support wall.

33. The sinker storage device of claim 32, wherein the vertical support wall on the second cup is formed with spline structure matingly engageable with the slot formation on the base of the other hub to enable changing angular position of the second cup relative to the other hub.

34. The sinker storage device of claim 33, wherein the central aperture on the other hub is aligned with the central hole on the vertical support wall of the second cup.

35. The sinker storage device of claim 34, wherein a fourth fastener is passed through the central aperture on the other hub and the central hole in the vertical support wall of the second cup to attach both cups and both hubs to the round support surface of the fishing boat.

36. The sinker storage device of claim 33, wherein the spline structure on the one cup and the second cup includes a vertical spline intersecting a horizontal spline at substantially a 90 degree angle.

37. The sinker storage device of claim 36, wherein the slot formations on the bases of both hubs include a vertical slot and a pair of diagonally extending slots intersecting the vertical slot enabling respective cups to be positioned at incremental 45 degree positions relative to their respective hubs.

* * * * *